United States Patent
Hinson et al.

(10) Patent No.: US 8,939,354 B1
(45) Date of Patent: Jan. 27, 2015

(54) SYSTEM AND METHOD FOR SECURE CARD PACKAGING AND ACTIVATION

(75) Inventors: Christopher Hinson, North Las Vegas, NV (US); Wilfred Frank Johnson, Jr., Las Vegas, NV (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 137 days.

(21) Appl. No.: 13/523,653

(22) Filed: Jun. 14, 2012

Related U.S. Application Data

(60) Provisional application No. 61/496,957, filed on Jun. 14, 2011.

(51) Int. Cl.
*G06F 17/00* (2006.01)

(52) U.S. Cl.
USPC .......................................... 235/375; 235/381

(58) Field of Classification Search
CPC .... A45C 11/182; B42D 15/045; B42D 15/10; B42D 2033/40; B42D 2037/10; G06F 21/10; G06K 19/00; G06K 19/005; G06Q 20/342; G07F 7/08; G07F 7/1008
USPC .......................... 235/375, 381, 486, 488, 492
See application file for complete search history.

(56) References Cited

U.S. PATENT DOCUMENTS

| | | | |
|---|---|---|---|
| 6,315,206 B1 * | 11/2001 | Hansen et al. | 235/487 |
| 6,439,613 B2 * | 8/2002 | Klure | 283/62 |
| 2004/0139318 A1 * | 7/2004 | Fiala et al. | 713/165 |
| 2007/0252009 A1 * | 11/2007 | Kingsborough et al. | 235/487 |
| 2011/0084144 A1 * | 4/2011 | McGrane | 235/488 |
| 2013/0234428 A1 * | 9/2013 | Irwin et al. | 283/100 |

* cited by examiner

*Primary Examiner* — Thien M Le
(74) *Attorney, Agent, or Firm* — Marsh Fischmann & Breyfogle LLP

(57) ABSTRACT

A secure card package including features such that an activable card disposed in the secure card package is activable only upon separation of a first portion and a second portion. The first portion and the second portion are separably interconnected along a separation line such that upon separation of the first portion and the second portion a reference edge is defined. A machine-readable activation data field is disposed on one of the first portion or second portion with respect to the reference edge such that the machine-readable activation data field is only readable upon separation of the first portion and the second portion to define the reference edge.

21 Claims, 9 Drawing Sheets

SYSTEM AND METHOD FOR SECURE CARD PACKAGING AND ACTIVATION

CROSS REFERENCE TO RELATED APPLICATIONS

This application claims priority to U.S. Provisional Application Ser. No. 61/496,957, filed on Jun. 14, 2011, and entitled "SYSTEM AND METHOD FOR SECURE CARD PACKAGING AND ACTIVATION," the entirety of which is hereby incorporated by reference.

FIELD OF THE INVENTION

The present invention relates to a secure card package and specifically to a secure card package, wherein a machine-readable activation data field including activation data corresponding to an activable card is only readable upon separation of a first and second portion of the secure card package.

BACKGROUND OF THE INVENTION

The purchase, sale, and use of transaction cards such as debit cards, gift cards, credit cards, telephone cards and the like has dramatically increased to the point where the cards are well known and their uses are widely recognized. At times, cards are printed and issued with a predetermined balance and typically sold as a retail item. However, a typical card is often stored or displayed in a non-inactivated state to reduce the risk of theft. This essentially renders the activable card valueless until it is activated by a retailer or another party upon purchase by the end user.

Despite these security features, activable cards (sometimes referred to as point-of-sale (POS) cards) are still stolen or subject to tampering and fraud, often by removing the card from its packaging. At other times, the theft can be more surreptitious. For example, the would-be thief may only remove a card from its packaging long enough to obtain proprietary account data as an account number or a PIN number, after which the card is returned to its packaging. In some instances, this information may be accessible without removing the card from the packaging. The thief can then wait until the card is activated and at that time gain unauthorized access to any value associated with the card. At other times, a would-be thief (possibly a retailer employee) may attempt to activate a card without authorization such that no indication of the activation may be detected. Thus, a card may be activated and the thief may gain unauthorized access to the funds associated with the card without evidence of the unauthorized activation.

Packaging with enhanced security that is capable of indicating unauthorized access to an activable card and/or activation data associated therewith reduces shrinkage due to theft of card value. As cards become more widely used internationally, new challenges arise that call for new solutions.

SUMMARY OF THE INVENTION

The present invention is directed to secure card packages. One aspect of the present invention includes a secure card package with a first portion separably interconnected to a second portion along a separation line. An activable card is disposed in the first portion such that a proprietary account data field on the activable card is unreadable. Upon separation of the first portion and the second portion along the separation line, a reference edge is defined. The secure card package includes a machine-readable activation data field disposed with respect to the separation line, wherein upon separation of the first portion and the second portion, the machine-readable activation data field is disposed relative to the reference edge so that the machine-readable activation data field is readable. The machine-readable activation data field is only readable by a complimentary reader upon separation of the first and second portion. In this regard, the machine-readable activation data field is unreadable when the first portion and the second portion are interconnected.

Another aspect of the present invention includes a method for handling a secure card package at a point-of-sale (POS) location to activate an activable card disposed within the package. The method includes separating a first portion and a second portion of the secure card package along a separation line at the POS location. Upon the separating of the first portion and the second portion, a reference edge is defined. A machine-readable activation data field is disposed relative to the separation line, wherein upon separation of the first portion and the second portion the machine-readable activation data field is disposed relative to the reference edge such that the machine-readable activation data field is only readable by a complimentary reader upon the separating of the first portion from the second portion. The method further includes reading the machine-readable activation data field, wherein the activable card is activated. The activable card is retained in the first portion throughout the separating step so that a proprietary account data field on the activable card is and remains unreadable.

A number of feature refinements and additional features are applicable to the foregoing aspects of the present invention. These feature refinements and additional features may be used individually or in any combination. As such, each of the following features that will be discussed may be, but are not required to be, used with any other feature or combination of features of the foregoing aspects of the present invention.

In one embodiment, the activable card is enclosed in the first portion. For example, the first portion may include an enclosed region that is sealed about one or more portions of a periphery thereof so as to restrict removal of the activation card from the enclosed region unless at least a portion of the sealed periphery is forcibly opened.

The machine-readable activation data field may be disposed on the second portion. In this regard, upon separation of the first portion and the second portion, the second portion may be used to read activation data from the machine-readable activation data field to activate the activable card, which is enclosed in the first portion. As such, the first portion may then be used to transport the now activated card (e.g., to a gift recipient of the card or the like). Alternatively, the machine-readable activation data field may be disposed on the first portion.

In various embodiments, the machine-readable activation data field may be positioned on the first portion or, alternatively, on the second portion. In this regard, the reference edge defined upon separation of the first portion and the second portion may be defined on the first portion or the second portion depending on the position of the machine-readable activation data field. The machine-readable activation data field may be disposed on an outer surface of the first portion or the second portion.

Alternatively, the machine-readable activation data field may be disposed on the activable card. In this regard, an aperture may expose a portion of the activable card disposed in the first portion. The aperture may expose the machine-readable activation data field on the activable card such that the machine-readable activation data field is positioned with respect to the separation line such that when the first portion and second portion are separated, the machine-readable activation data field is disposed relative to the reference edge so that the machine-readable activation data field can be read by a complimentary reader.

Alternatively or additionally, an aperture may be provided through which a portion of the activable card is exposed other than a machine-readable activation data field (e.g., card graphics, logos, terms and conditions, etc.). Accordingly, the aperture may be provided in the first panel and/or second panel of the first portion.

In any regard, the machine-readable activation data field may be read once the first portion and second portion have been separated such that the reference edge defined upon the separation is used to index the machine-readable activation data field with respect to the complimentary reader.

In another embodiment, the first portion and/or second portion may comprise a first panel and a second panel. The first panel and second panel may be joined along one or more connections. For example, the first portion may include an end connection interconnecting the first and second panels adjacent to the separation line and/or side connections extending along corresponding edge portions of the first and second panels connecting the first and second panels along the length of at least the first portion. The end connections and side connections may comprise the enclosed portions as discussed above. The end connection and/or side connections between the first panel and the second panel may be formed by any appropriate method. For example, the connections may be glued, welded (e.g., using heat and/or ultrasonic energy), mechanically attached, etc.

In one embodiment, the first panel and second panel may also be integrally interconnected along an adjoinment region. In one embodiment, the first panel and second panel may define the enclosed region in which the activable card is disposed. The activable card may remain enclosed in the enclosed region upon separation of the first portion and the second portion. The adjoinment region may be opposite the separation line on the first portion. Alternatively, the adjoinment region may be generally perpendicular to the separation line. The secure card package may include features that may indicate the secure card package has been tampered with. For example, the connections joining the first panel and second panel may be provided such that any tampering (e.g., an attempt to gain unauthorized access to the activable card) may result in the first panel and/or second panel of the secure card package to become visually altered. Furthermore, the separation line at the interconnection of the first portion and second portion may become visually altered upon attempted access to the machine-readable activation data field (e.g., in an attempt to surreptitiously activate the activable card). For example, deflection between the first portion and the second portion at the separation line may visually alter the secure package such that tampering is evidenced. In one embodiment, deflection between the first portion and the second portion of less than 90 degrees results in the visual alteration of the secure card package.

The separation line may include features that assist in separation of the first portion and the second portion along the separation lien to define the reference edge. In this regard, the separation line may include perforations, a thinned region, a frangible region, a tab, a rip cord, or other appropriate features to assist in the separation of the first portion and the second portion.

In another embodiment, a plurality of activable cards may be disposed in the first portion. Activation data read from the machine-readable activation data field is used to activate all of the plurality of activable cards. The activation data may include data corresponding to proprietary card data for one or more of the plurality of cards. Alternatively, the machine-readable activation data field may include independent activation data which is independent of any proprietary card data of the plurality of activable cards. The independent activation data may be correlated to each of the plurality of activable cards for activation thereof.

The plurality of activable cards may have predetermined values that may be used to conduct transactions upon activation. The plurality of activable cards may each have the same predetermined value. Alternatively, two or more of the plurality of activable cards may have different predetermined values.

Alternatively, the plurality of activable cards may have values that are selectable upon activation of the plurality of activable cards (e.g., through purchase of a selected card value at the time of activation). The plurality of activable cards may have the same selected card value upon activation or the plurality of cards may have different selected card values.

The plurality of activable cards may all be redeemed at the same merchant or merchants. Alternatively, the plurality of activable cards may be redeemable at different merchants.

A system for activating an activable card of a secure card package according to any of the foregoing aspects and embodiments may be provided. The system includes a database that is used to maintain activation status data of the activable card (e.g., as "active" or "inactive"). Activation data associated with the activable card is correlated in the database to the activable card. During an activation process using the system, the activation data is read from the secure card package at a point of activation. The activation data is communicated to the database with a command to activate the activable card. Upon receipt of the activation data with the activation command at the database, the activable card correlated to the activation data is identified and the activation status data of the activable card is changed in the database from inactive to active, rendering the activable card active. Additionally, the activation status data of the activable card may be changed from active to inactive through receipt of the activation data at the database with a command to deactivate the activable card.

In one embodiment, a plurality of activable cards may be correlated to activation data in the database. In this regard, upon receipt of the activation data and an activation or deactivation command, the plurality of cards may be identified in the database based on the correlation of each of the plurality of activable cards to the activation data. In this regard, the activation status data for each of the plurality of cards is changed appropriately upon receipt of the activation data and an activation or deactivation command. For example, a secure card package including activation data may contain the plurality of cards as discussed above. Upon receipt of the activation data, each of the plurality of cards contained in the secure card package may be identified in the database and the activation status data for each of the plurality of cards may be changed in the database, thus activating each of the plurality of cards based on receipt of the activation data.

Once activated, an activable card may be used as a transaction card for value. In this regard, the database may be referenced during the processing of a transaction initiated using the activable card to verify the activation status of the activable card prior to authorization of the transaction. As such, during a transaction initiated using the activable card, proprietary card data associated with the activable card is read and communicated to the database. The proprietary card data is correlated to the activable card in the database. Upon receipt of the proprietary card data at the database, the proprietary card data may be used to identify in the database the activable card to determine if the activable card is active or inactive. If the activable card is inactive, any transaction initiated using the card is not authorized. If the activable card is active, processing of the transaction continues.

The activation data received at the database may be data unique from the proprietary card data used during a transaction initiated using the activable card. Alternatively, the proprietary card data may be used as the activation data as well as for a transaction initiated using the activable card. In this regard, when activating or deactivating the activable card using proprietary card data, the proprietary card data is communicated to the database with an activation or deactivation command. In contrast, when the proprietary card data is communicated to the database to verify the activation status of the activable card, the proprietary card data is communicated with a verification query. The verification query results in verification of the activation status of the activable card being used to initiate a transaction rather than changing the status data of the activable card.

In one embodiment, the point of activation may be the point of sale of the secure card package to a consumer. Alternatively, the point of activation may be different than the point of sale, wherein the process for purchase and the process for activation of the activable card are independent. For example, the activable card may be purchased, yet not activated, at a point of sale. The activable card may subsequently be activated at a point of activation remote from the point of sale (e.g., a user's home, at a location where the activable card is to be used for value, etc.). Accordingly, the database may also include purchase data correlated to the activable card. In this regard, upon purchase of the activable card, an identifier (e.g., proprietary card data, activation data, or some other card data independent of the proprietary card data and activation data that is correlated to the activable card in the database) may be communicated to the database along with an indication that the activable card has been purchased. The database may be updated in response to receipt of the indication of purchase to reflect the activable card has been purchased. When performing the activation of the activable card as described above, activation of the activable card is allowed only if the purchased data in the database reflects that the activable card has been purchased. Thus, an attempt to activate and use the activable card without purchase of the activable card may be thwarted by only allowing activable cards that have been purchased to be activated.

In one embodiment, the activable card may have a predetermined value defined in the database. Upon activation of the activable card, the predetermined value is available to use in transactions initiated using the activable card. Alternatively, the activable card does not have a predetermined value defined in the database, but rather a value of the activable card may be defined in the database upon purchase of the activable card. For example, along with the receipt of the indication that the activable card has been purchased as described above, the value of the activable card as determined at the time of purchase may also be communicated to the database. The database is then updated to reflect the value for the activable card. The value may be chosen by the purchaser at the time of purchase of the activable card. The value of the activable card may coincide with the purchase price of the card or the value may be higher or lower than the purchase price of the card. For example, the purchase price of the activable card may be lower than the value of the activable card such that the activable card represents a discount on items purchased using the activable card.

In any regard, the database may be updated to reflect the use of the activable card in transactions. In this regard, a current account balance may also be maintained in the database for the activable card. The current account balance may reflect the balance of funds available for the activable card. A user may request to receive the current account balance of the activable card reflected in the database. For example, the user may provide proprietary card data, activation data, or another unique identifier correlated with the activable card in the database to access the database and retrieve the current account balance for the activable card. Furthermore, the account balance of the activable card may be retrieved from the database upon initiation of a transaction using the activable card to verify the account balance includes sufficient funds to complete the transaction. If sufficient funds are not available for the activable card, the transition is not authorized. If sufficient funds are available, processing of the transaction continues.

The database may be maintained by, or be accessible by, a card issuer (e.g., a financial institution). The card issuer may use the database for both activation of the activable card and processing of transactions initiated using the activable card as described above. The database may be maintained remotely or locally with respect to the point of activation. For example, in the case of a remotely located database, communication with the database may be facilitated by network communication over an appropriate network (e.g., the Internet) that is in communication with the point of activation and the database. For a local database, the sale, activation, and initiation of a transaction using the activable card may occur at a common location (e.g., a particular merchant). Thus, the database may be maintained locally at the common location.

Numerous additional features and advantages of the present invention will become apparent to those skilled in the art upon consideration of the embodiment descriptions provided hereinbelow.

DETAILED DESCRIPTION

Figure 1:
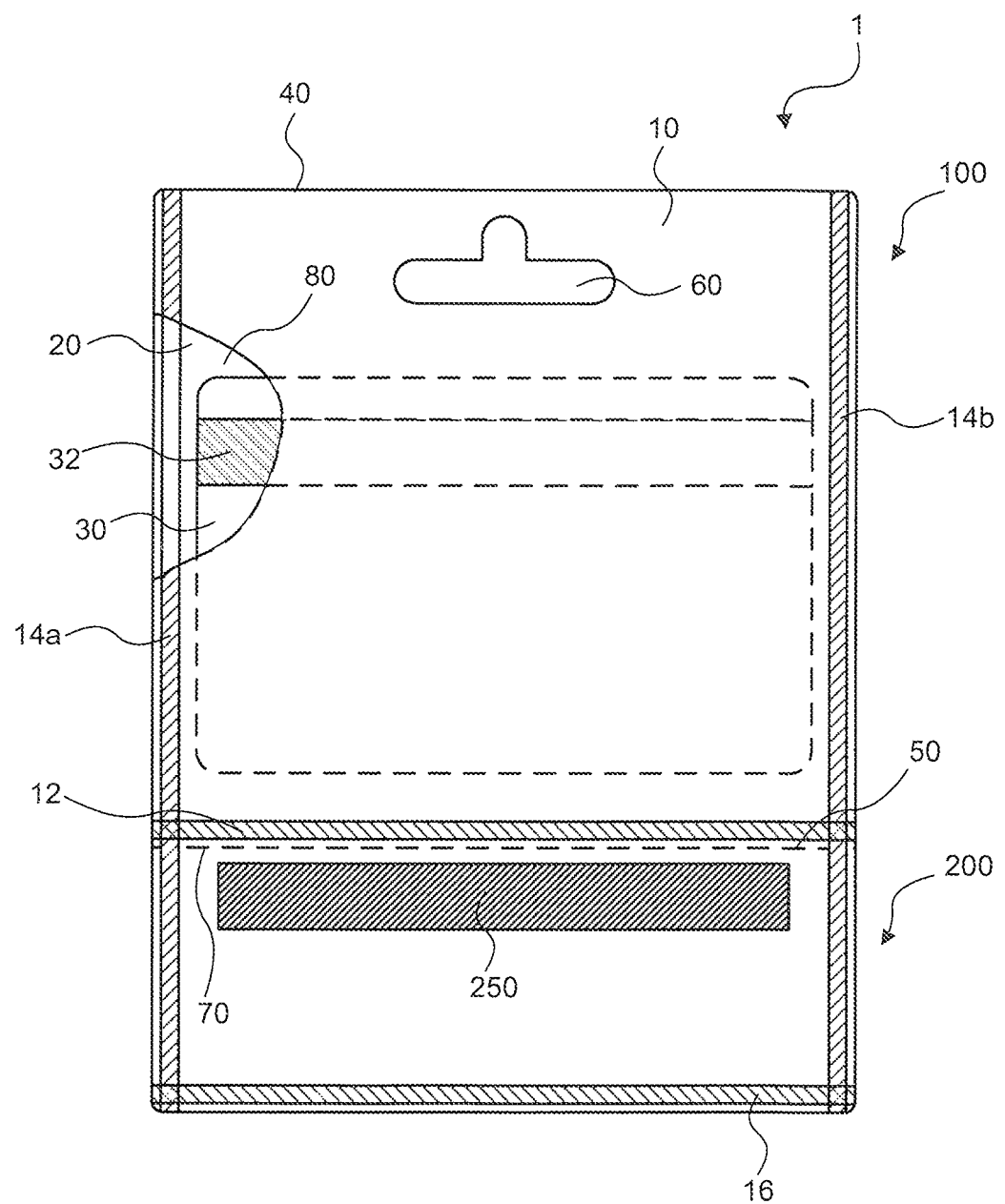
FIG. 1 illustrates an embodiment of a secure card package.
Figure 2:
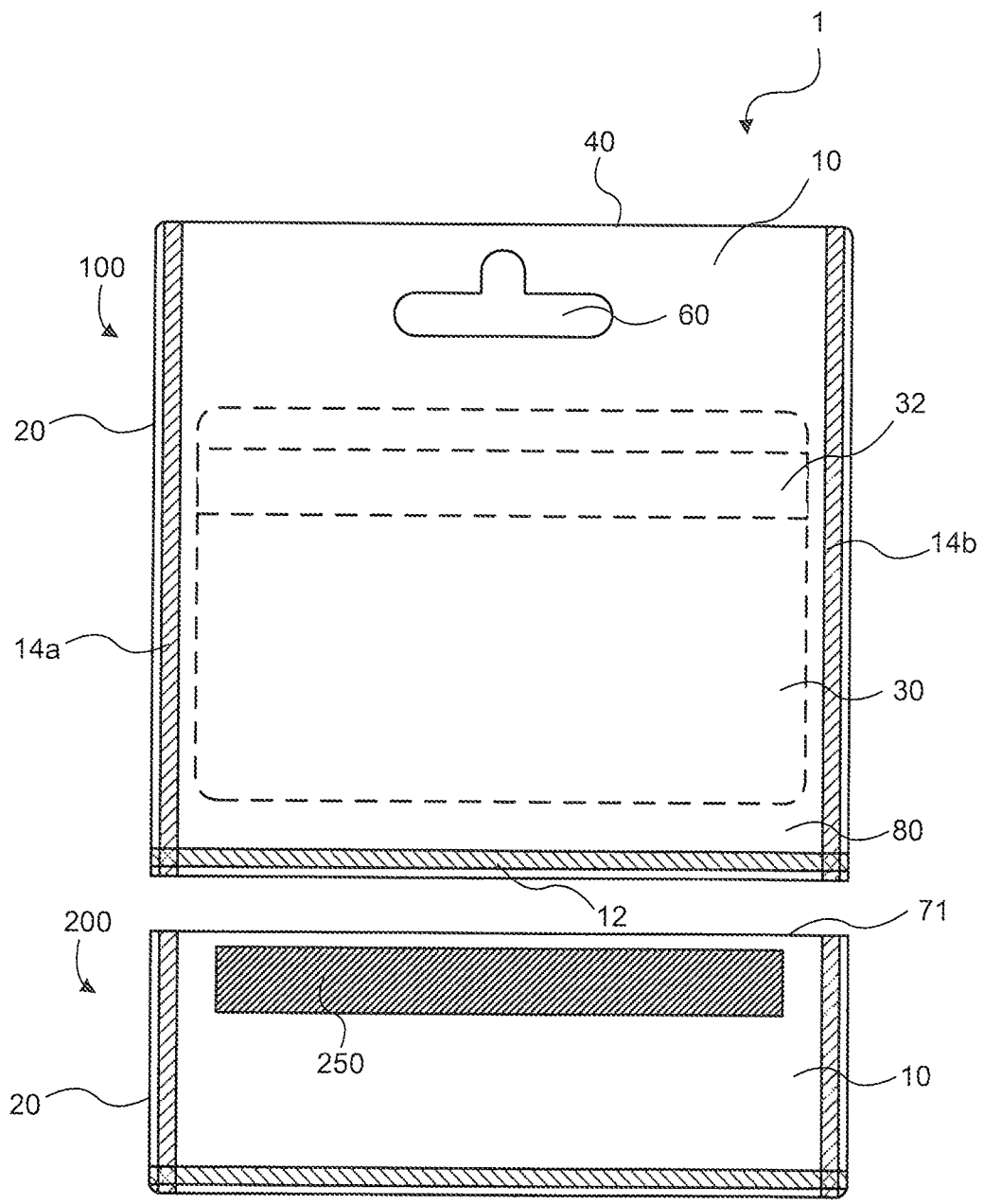
FIG. 2 shows the embodiment of FIG. 1 in a separated configuration.

FIG. 1 illustrates an embodiment of a secure card package 1. The secure card package 1 includes a first portion 100 and a second portion 200 separably interconnected to the first portion 100 along a separation line 70 such that a reference edge is defined upon separation of the first portion 100 and the second portion 200. An activable card 30 is disposed within the first portion 100 such that a proprietary account data field 32 disposed on the activable card 30 is unreadable. The secure card package 1 includes a machine-readable activation data field 250 that contains activation data that may be used to activate the activable card 30. As depicted in FIG. 1, the machine-readable activation data field 250 may be disposed on an outer surface of the second portion 200 such that the machine-readable activation data field 250 is not readable when the second portion 200 is interconnected to the first portion 100 as will be discussed in greater detail below. The machine-readable activation data field 250 is disposed on the secure card package 1 such that when the second portion 200 is separated from the first portion 100 as shown in FIG. 2, the machine-readable activation data field 250 is spaced from a reference edge 71 defined upon separation of the first portion 100 and the second portion 200 such that the machine-readable activation data field 250 may be read by a complimentary reader. The machine-readable activation data field 250 may be read to obtain the activation data to complete the activation of the activable card 30.

In one embodiment, the machine-readable activation data field 250 may comprise a magnetic stripe that includes activation data. As such, in order to activate the activable card 30, the machine-readable activation data field 250 may be swiped through a magnetic stripe reader to acquire the activation data used to activate the activable card 30. It will be appreciated that the use of such magnetic stripe readers generally involves swiping a substrate through a reader such that the magnetic stripe on the substrate is passed by a magnetic reading head. The magnetic stripe is specifically located with respect to an edge of the substrate that is passed through the reader such that the edge of the substrate upon which the magnetic stripe is disposed indexes the magnetic stripe with respect to the magnetic reading head to position the magnetic stripe in a correct orientation with respect to the magnetic reading head. Accordingly, the spacing of the magnetic stripe with respect to the edge of the substrate used to index the magnetic stripe with respect to the magnetic stripe reader must be a predetermined distance appropriate for the corresponding reader. As such, the spacing and/or size of the machine-readable activation data field 250 may be provided according to one or more International Organization for Standardization (ISO) standards (e.g., ISO standard 7813).

The location of the machine-readable activation data field 250 of the secure card package 1 may be disposed such that the machine-readable activation data field 250 is unreadable when the first portion 100 and the second portion 200 are interconnected. This may be because the machine-readable activation data field 250 is spaced apart from each edge of the secure card package 1 such that no edge correctly indexes the machine-readable activation data field 250 with respect to a complimentary reader when the first portion 100 is interconnected to the second portion 200. However, the machine-readable activation data field 250 of the secure card package 1 is disposed on the second portion 200 with respect to the separation line 70 such that once the second portion 200 has been separated from the first portion 100 along the separation line 70 as shown in FIG. 2, the machine-readable activation data field 250 is spaced from the reference edge 71 such that the machine-readable activation data field 250 readable by a magnetic reading head.

In this regard, in order to activate the activable card 30, the second portion 200 is separated from the first portion 100 such that the machine-readable activation data field 250 is readable. If the second portion 200 has been separated from the first portion 100 prior to presentation at a point-of-sale (POS), the secure card package 1 may have been tampered with and a purchaser or the like may choose a different secure card package 1 that does not include indications of tampering.

As stated above, the activable card 30 may be disposed in the first portion 100 such that a proprietary account data field 32 on the activable card 30 is unreadable. For example, the proprietary account data field 32 may include data that may be used for value to conduct a transaction. The proprietary account data field 32 may include account information, a personal identification number (PIN), or other proprietary account data that may be employed in a transaction using the activable card 30. The proprietary account data field 32 may be a magnetic stripe, a barcode, human readable data, or some other appropriate type of data field. In this regard, the activable card 30 may be a transaction card that, once activated, may be used for value at a merchant. The activable card 30 may be a prepaid debit card, a credit card, a gift card, a telephone card, or some other appropriate type of transaction card.

In one embodiment, the first portion 100 is defined by a first panel 10 and a second panel 20. With additional reference to FIG. 3, a partially assembled secure card package 1 is shown. The first panel 10 and second panel 20 may be integrally interconnected along an adjoinment region 40. In this regard, the first panel 10 and second panel 20 may be formed from a single sheet of card stock, paper stock, or other appropriate substrate. The activable card 30 may be disposed with respect to one of the first panel 10 or second panel 20 (e.g., with the use of an adhesive 34 or the like). The first panel 10 may be folded about the adjoinment region 40 to overlay the second panel 20 as shown in FIG. 1. The first panel 10 and second panel 20 may also each include openings 60 that may, when the first panel 10 is overlaid with respect to the second panel 20, align to define an opening 60 through the secure card package 1 (e.g., for hanging the secure card package 1 at a POS location or the like).

The first panel 10 and second panel 20 may also be joined along one or more joints or connections once the first panel 10 is overlaid with respect to the second panel 20. For instance, as shown in FIGS. 1 and 2, side connections 14a, 14b may extend along corresponding edge portions of the first panel 10 and second panel 20 at peripheral edges of the secure card package 1 along the length of the first panel 10 and the second panel 20. The side connections 14a, 14b may connect the first panel 10 to the second panel 20 along the length of the side connections 14a, 14b, thus preventing the first panel 10 from separating from the second panel 20 and maintaining the secure card package 1 in the folded configuration shown in FIG. 1.

In one embodiment, the first portion 100 may also include an end connection 12 that connects the first panel 10 and second panel 20 adjacent to the separation line 70. In this regard, the first portion 100 may define an enclosed region 80 in which the activable card 30 is disposed. This enclosed region 80 may be between the first panel 10 and second panel 20 and be collectively defined by the adjoinment region 40; side connections 14a, 14b; and the end connection 12. Accordingly, upon separation of the second portion 200 from the first portion 100 the enclosed region 80 may remain intact such that the activable card 30 remains disposed therein. Alternatively, a secure card package may be provided without the end connection 12 or an end connection may be provided on the second portion adjacent to the separation line 70.

The end connection 12 and/or side connection 14a, 14b may be formed by any appropriate technique for interconnecting the first panel 10 and the second panel 20. For example, the side connections 14a, 14b and end connection 12 may be formed by ultrasonic welding of the first panel 10 and the second panel 20 to interconnect the two. Alternatively or additionally, an adhesive may be applied to one or both of the first panel 10 or second panel 20 to form the connections. Further still, the first panel 10 may be interconnected to the second panel 20 by way of application of heat to form one or more of the connections. Also, while shown in FIG. 1 as continuous connections, the side connections 14a, 14b and end connection 12 may also be discontinuous (e.g., including discrete segments where the first panel 10 is connected to the second panel 20 along the length of the connection).

Figure 3:
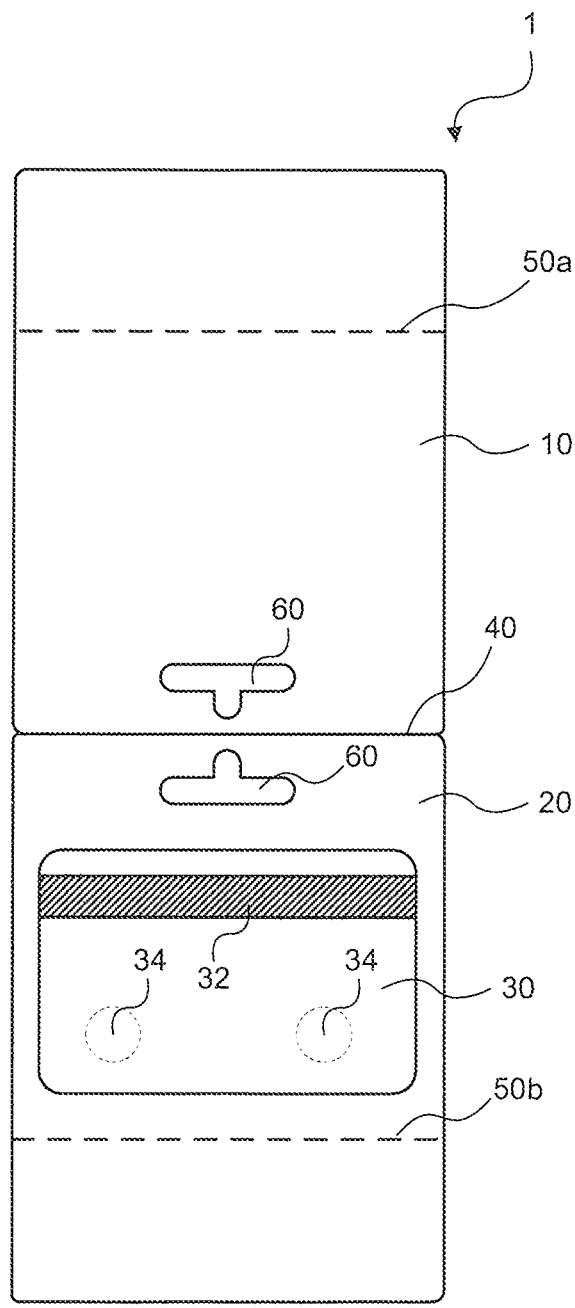
FIG. 3 shows the embodiment of FIGS. 1 and 2 in a partially assembled configuration.

With continued reference to FIG. 3, the first panel 10 may include a score line 50a and second panel 20 may also have a score line 50b as best seen in FIG. 3. The score lines 50a and 50b may be located adjacent to each other when the first panel 10 is overlaid with respect to the second panel 20. In turn, score lines 50a and 50b may collectively define the separation line 70. In this regard, separation of the first panel 100 and second panel 200 along the separation line 70 may be assisted by the score lines 50a and 50b. In this regard, the score lines 50a and 50b, and consequently the separation line 70, may include features assisting to facilitate separation of the first portion 100 from the second portion 200. The separation line 70 may include perforations extending through the first panel 10 and/or second panel 20, a thinning of the first panel 10 and/or second panel 20, a frangible region of the first panel 10 and or second panel 20, a tab, a rip cord, or other structure to assist in the separation of the first portion 100 from the second portion 200 along the separation line 70. Additionally, the first panel 10 and/or second panel 20 may comprise the second portion 200 that is separably interconnected to the first portion 100 along the separation line 70 to define the reference edge 71.

The secure card package 1 may include features that alert a user to tampering. For example, separation of the first panel 10 from the second panel 20 along the side connections 14a, 14b or end connection 12 may visibly alter the first panel 10 and/or second panel 20. For example, upon separation of the first panel 10 from the second panel 20 after being joined as discussed above, areas of the first panel 10 and/or second portion 20 may become ripped, delaminated, plastically deformed or otherwise visually altered to indicate attempted tampering with the secure card package 1. In this regard, any tampering with the first portion 100 or second portion 200 (e.g., an attempt to access the proprietary account data field 32 of the activable card 30) may be detected by a user.

Additionally, the separation line 70 may include tampering indicating features. In one embodiment, a predetermined amount of deflection of the second portion 200 with respect to the first portion 100 visually alters the secure card package 1 adjacent to the separation line 70. This may include plastic deformation of the first panel 10 and/or second panel 20 adjacent to the separation line 70, separation of the first portion 100 and second portion 200, or other visual indication of tampering (e.g., an attempt to access the machine-readable activation data field 250). In one embodiment, deflection of the second portion 200 with respect to the first portion 100 of no more than about 90 degrees results in the visual alteration of the secure card package 1.

Figure 4:
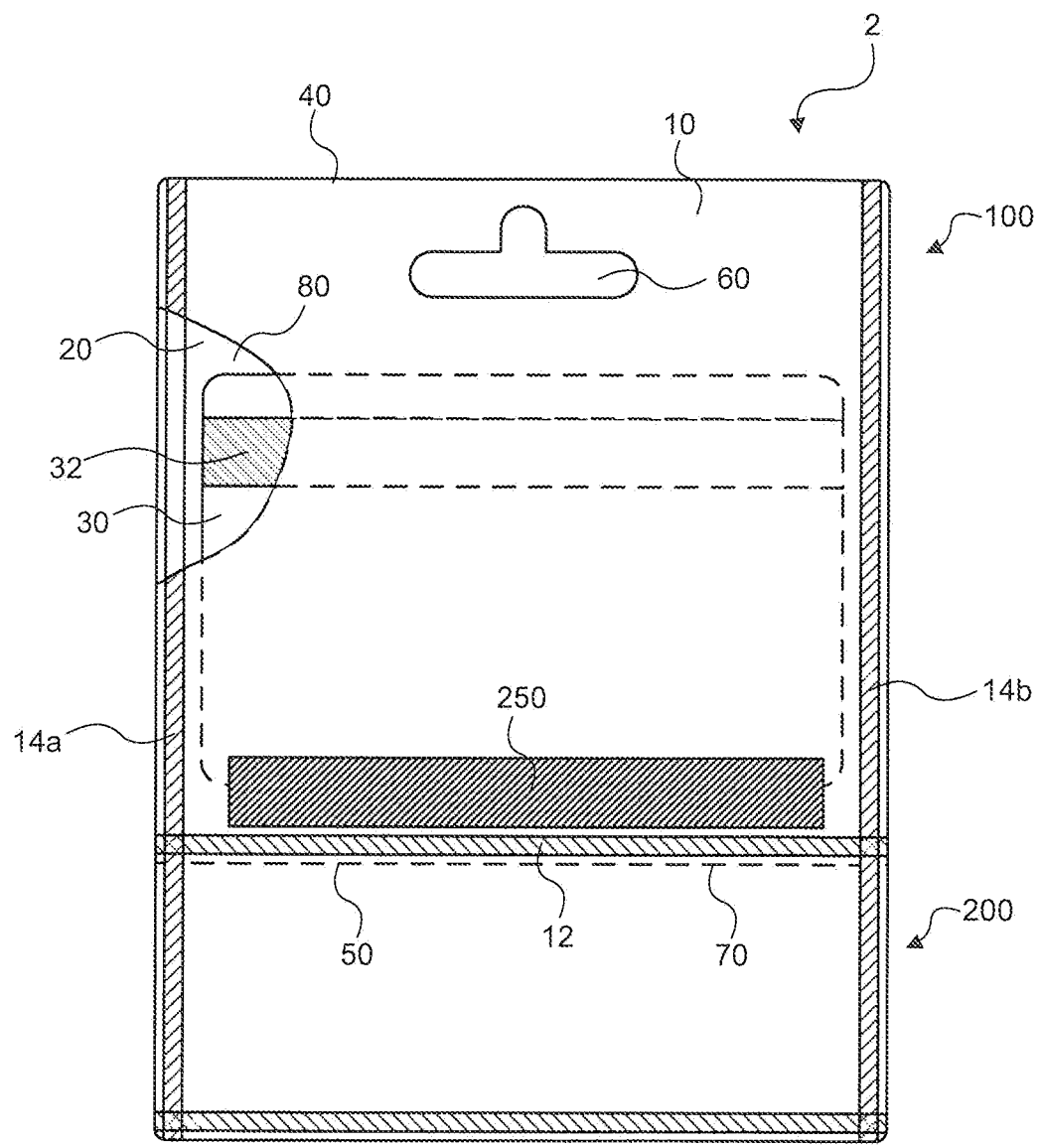
FIG. 4 illustrates another embodiment of a secure card package.

FIG. 4 depicts another embodiment of a secure card package 2. The secure card package 2 may be substantially similar to the secure card package 1 described above with the exception that the secure card package 2 includes the machine-readable activation data field 250 on an outer surface of the first portion 100. Accordingly, common reference numerals will be used throughout this description to denote common features appearing among the various embodiments presented herein. As discussed above, the machine-readable activation data field 250 of the secure card package 2 may be unreadable when the first portion 100 is interconnected to the second portion 200.

Figure 5:
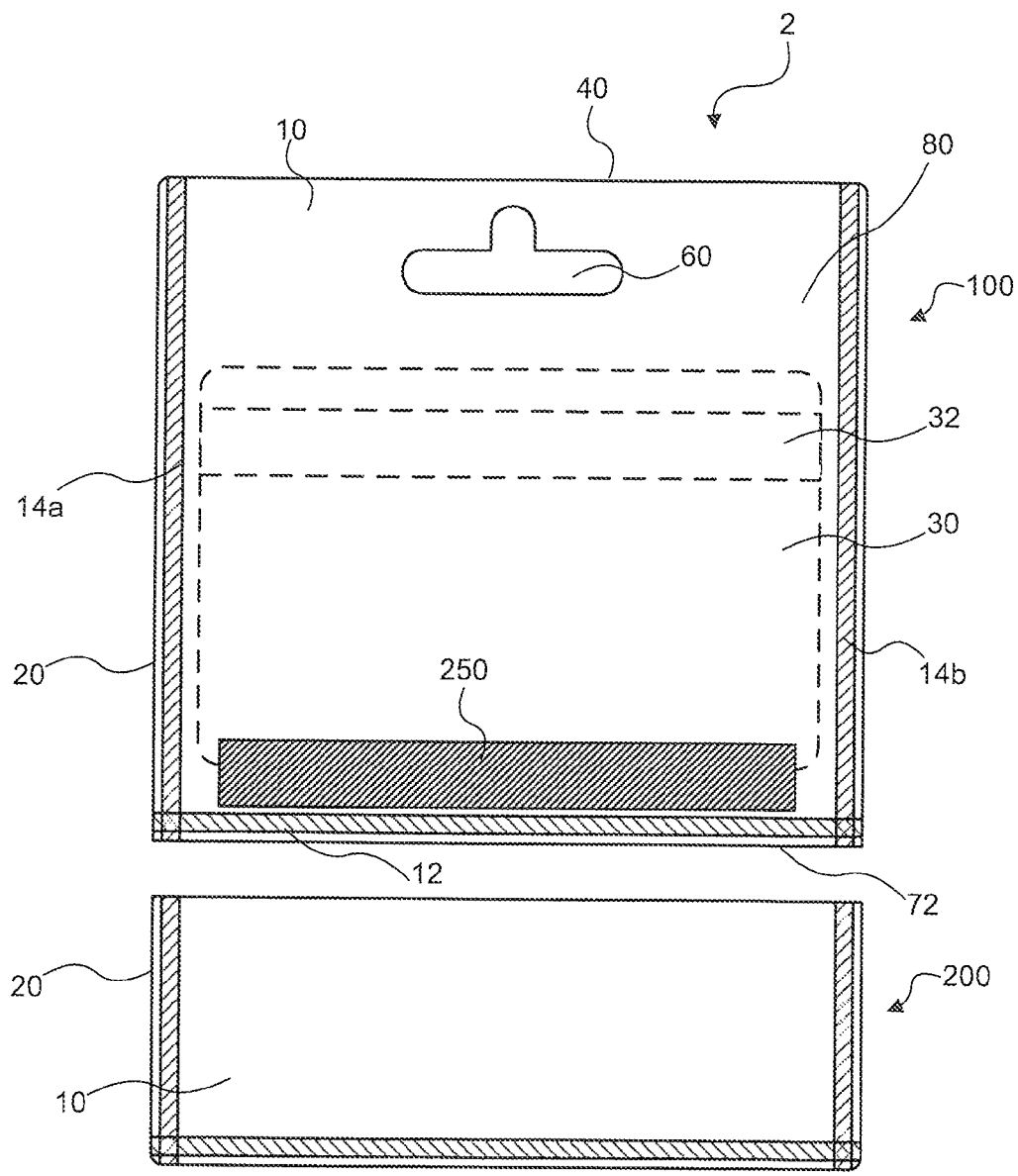
FIG. 5 shows the embodiment of FIG. 4 in a separated configuration.

With additional reference to FIG. 5, the machine-readable activation data field 250 may be spaced apart from a reference edge 72 defined upon separation of the first portion 100 from the second portion along the separation line 70 of the secure card package 2. In this regard, the first portion 100 may be swiped through a magnetic card reader such that the reference edge 72 of the first portion 100 indexes the machine-readable activation data field 250 with respect to a magnetic reading head.

Figure 6:
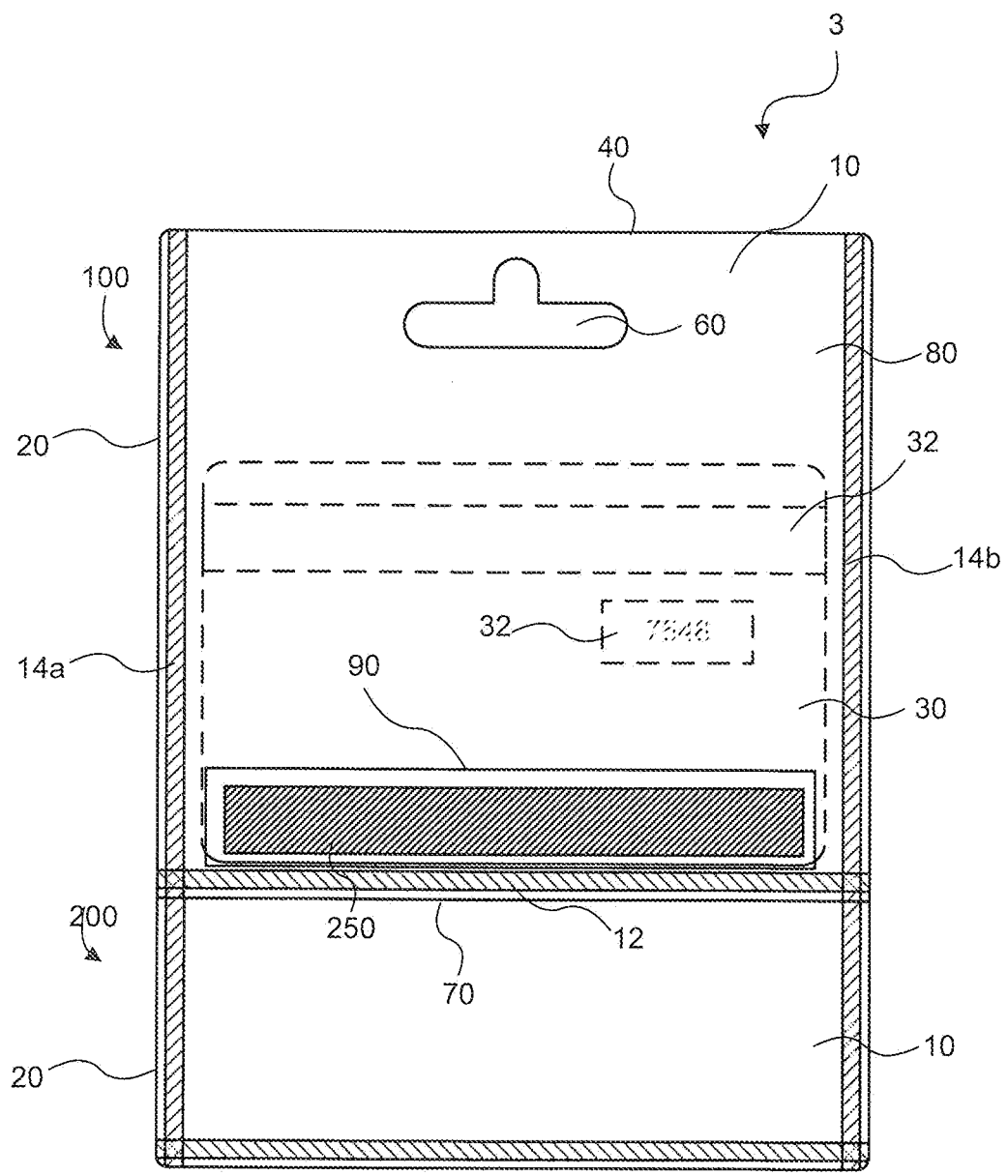
FIG. 6 illustrates yet another embodiment of a secure card package.
Figure 7:
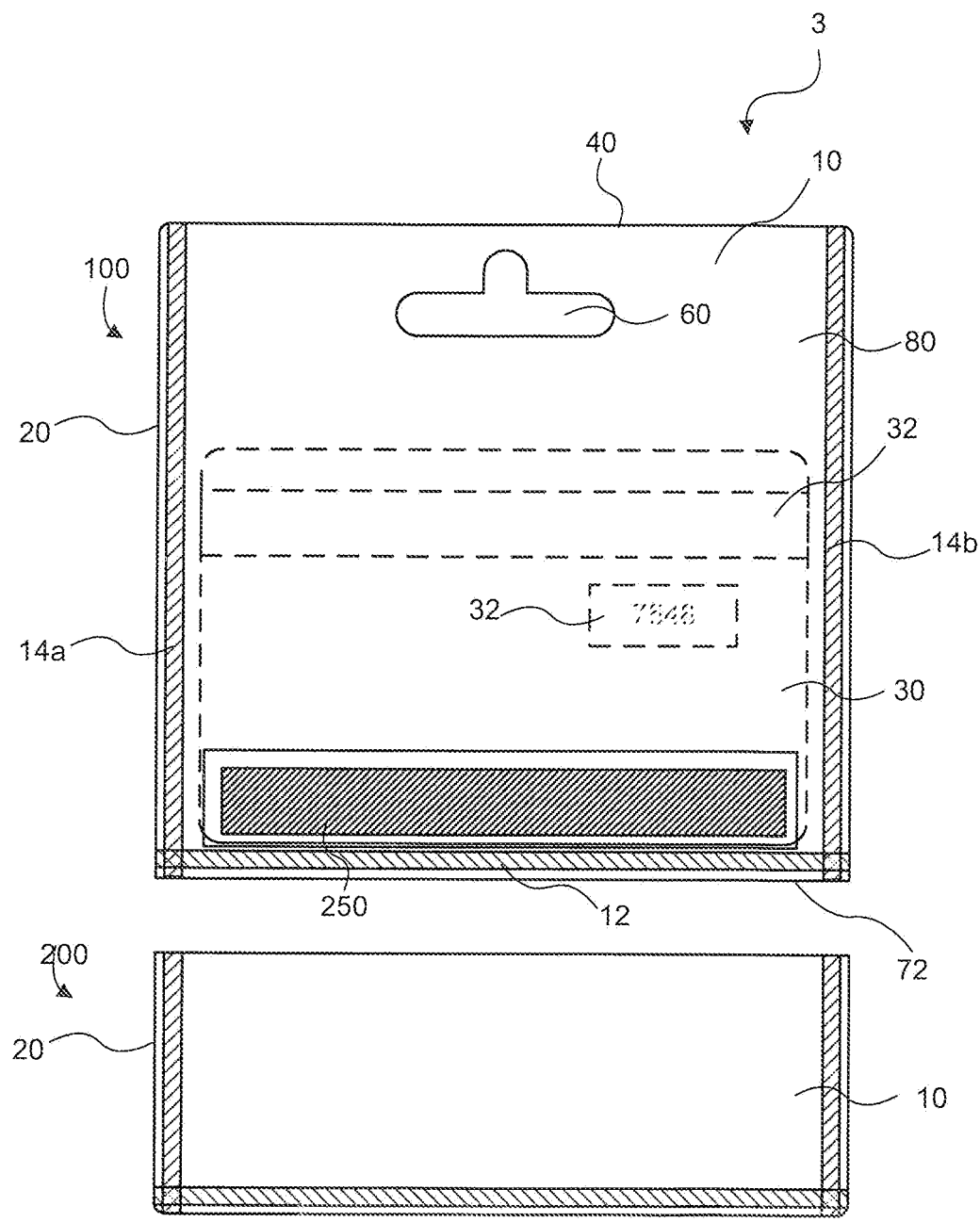
FIG. 7 shows the embodiment of FIG. 6 in a separated configuration.

FIGS. 6 and 7 depict another embodiment of a secure card package 3. The secure card package 3 includes an aperture 90. The aperture 90 exposes a portion of the activable card 30 to an exterior of the secure card package 3. In this regard, a machine-readable activation data field 250 may be disposed on the activable card 30 such that the machine-readable activation data field is exposed through the aperture 90. However, proprietary account data fields 32 remain obscured. The exposed machine-readable activation data field 250 may be disposed with respect to a separation line 70, such that when the first portion 100 and the second portion 200 are separated (as shown in FIG. 7), the machine-readable activation data field 250 may be located with respect to the reference edge 72 on the first portion such that the machine-readable activation data field 250 is readable. As described above with the previous embodiments, the machine-readable activation data field 250 may only be readable once the first portion 100 and second portion 200 have been separated at the separation line 70.

In another embodiment, an aperture may be provided at the first portion that exposes a portion of the activable card 30 other than a machine-readable activation data field (e.g., graphics, logos, terms and conditions, etc.), while maintaining proprietary account data fields obscured. Such an aperture may be provided through the first panel 10 and/or the second panel 20.

Figure 8:
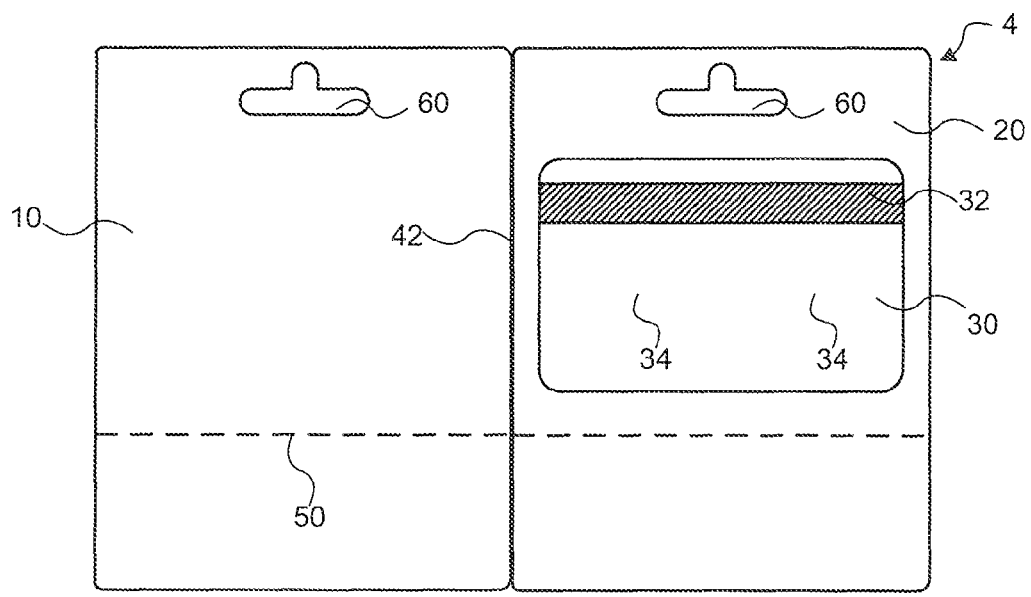
FIG. 8 illustrates another embodiment of a secure card package in a partially assembled configuration.
Figure 9:
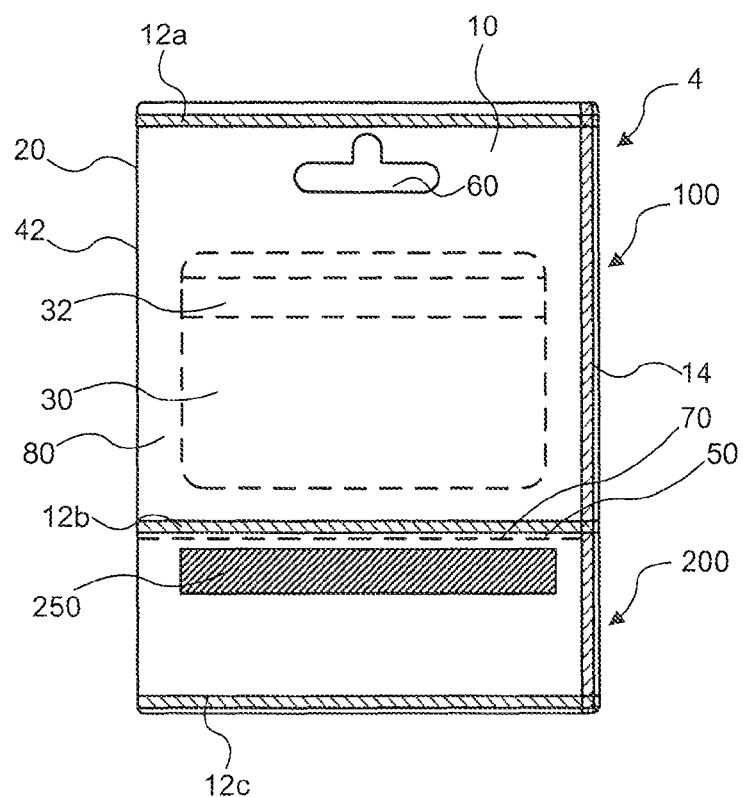
FIG. 9 shows the embodiment of FIG. 6 in an assembled configuration.

FIGS. 8 and 9 depict another embodiment of a secure card package 4. Whereas the secure card packages discussed above are arranged such that the adjoinment region 40 integrally connecting the first panel 10 and second panel 20 is opposite to the separation line 70 on the first portion 100, the secure card package 4 may include an adjoinment region 42 that is substantially perpendicular to a separation line 70. In this regard, as shown in FIG. 7, the first panel 10 may be folded about the adjoinment region 42 to overlay the second panel 20. The separation line 70 may be perpendicular to the adjoinment region 42. In this regard, a plurality of end connections 12a, 12b may be provided between the adjoinment region 42 and at least a side connection 14 extending along the periphery of the first panel 10 and second panel 20 opposite the adjoinment region 42 to define an enclosed area 80 in which the activable card 80 is disposed.

Figure 10:
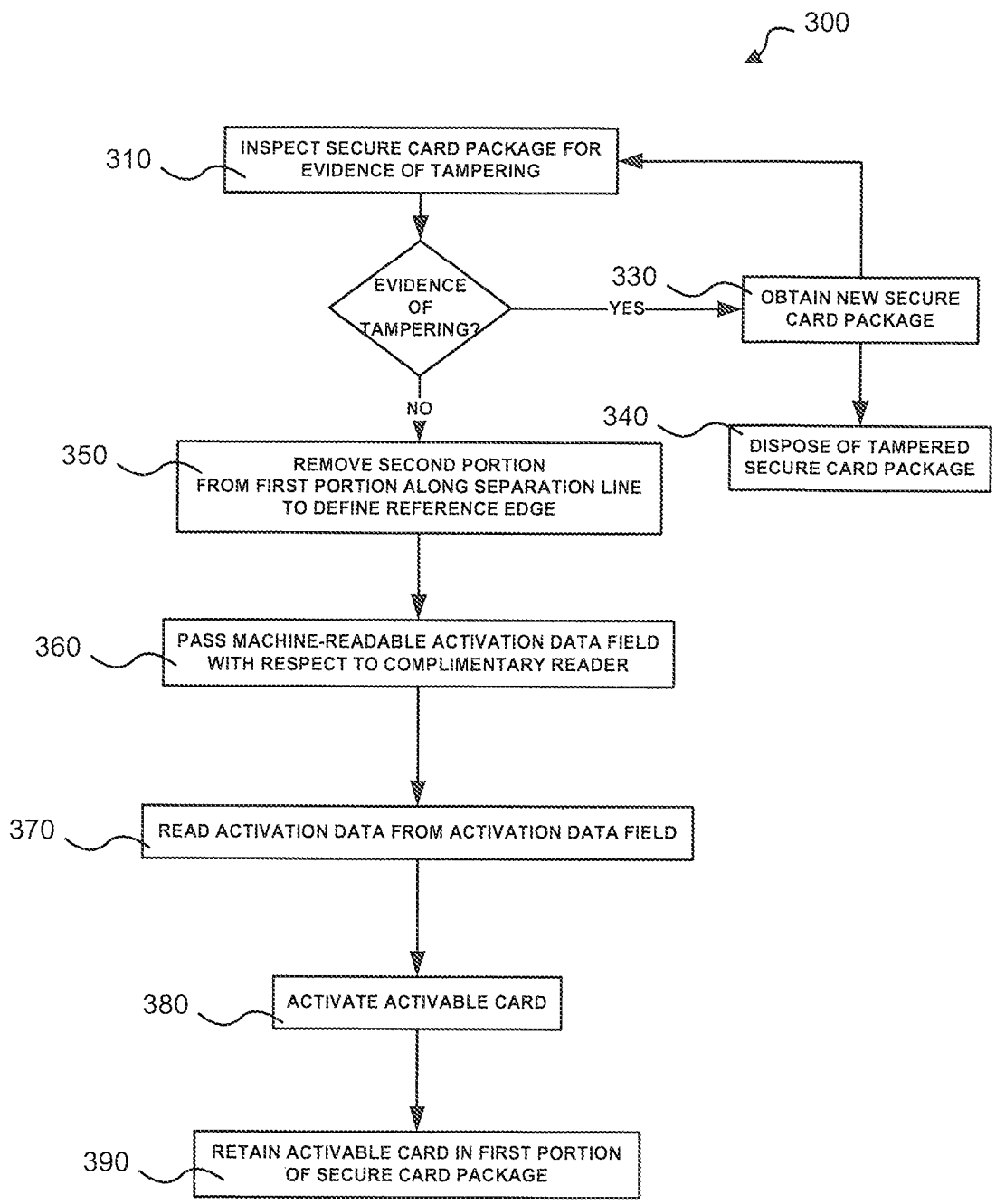
FIG. 10 illustrates an embodiment of a method for handling a secure card package at a point-of-sale (POS) for activation of an activable card.

FIG. 10 illustrates a flow chart of an embodiment of a method 300 for handling a secure card package at a POS location. The method 300 may include inspecting 310 a secure card package for evidence of tampering (e.g., in an attempt to access the machine-readable activation data field or the proprietary account data field on the activable card). For example, the inspecting 310 may include examining the separation line of the secure card package and/or one or more connections to determine if the package has been tampered with.

If there is evidence of tampering, the method 300 may include obtaining 330 a new secure card package for activation. As such, the method 300 may include inspecting 310 the new card package for tampering. The method 300 may also include disposing 340 of the tampered with secure card package.

If there is no evidence of tampering, the second portion may be separated 350 from the first portion along the separation line to define a reference edge. The method 300 may then include passing 360 the machine-readable activation data field with respect to a complimentary reader to read 370 activation data. As discussed above, passing 360 the machine-readable activation data field with respect to the complimentary reader is not possible prior to separating 350 the second portion from the first portion. The method 300 may include activating 380 the activable card disposed in the first portion. The activating 380 may include transmission and/or receipt of data read 370 from the machine-readable activation data field. The method 300 may also include retaining 390 the activable card in the first portion. In this regard, the first portion in which the activable card is retained 390 may be delivered to the purchaser, a recipient of the gift card, or otherwise use to transport the activable card 300.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A secure card package, comprising:
 a first portion;
 a second portion separably interconnected to the first portion along a separation line and separable from the first portion to define a reference edge of the secure card package that is established only upon the separation of the second portion from the first portion;
 at least one activable card disposed within the first portion so that a proprietary account data field on the activable card is unreadable; and
 a machine-readable activation data field comprising a magnetic stripe that is disposed with respect to the separation line, wherein upon separation of the second portion from the first portion to define the reference edge, the machine-readable activation data field is located relative to the reference edge such that machine-readable activation data field is only readable by a complimentary reader upon separation of the second portion from the first portion as the magnetic stripe is only indexed relative to the reference edge for passage through the complimentary reader.

2. A secure card package as recited in claim 1, wherein the machine-readable activation data field is disposed on an outer portion of the second portion.

3. A secure card package as recited in claim 2, wherein the at least one activable card is enclosed in the first portion.

4. A secure card package as recited in claim 1, wherein the first portion comprises opposing first and second panels and the at least one activable card is at least partially disposed therebetween.

5. A secure card package as recited in claim 4, wherein the first portion comprises an end connection interconnecting the first and second panels adjacent to the separation line.

6. A secure card package as recited in claim 5, wherein the first portion comprises side connections extending along corresponding edge portions of the first and second panels connecting the first and second panels along the length of at least the first portion.

7. A secure card package as recited in claim 6, wherein the first portion comprises an enclosed region between the first and second panels in which the at least one activable card is disposed.

8. A secure card package as recited in claim 7, wherein the opposing first and second panels are integrally interconnected along an adjoinment region.

9. A secure card package as recited in claim 8, wherein the adjoinment region is opposite the separation line on the first portion.

10. A secure card package as recited in claim 9, wherein the enclosed region remains enclosed upon separation of the second portion from the first portion.

11. A secure card package as recited in claim 10, wherein separation of the first panel from the second panel along the end connection or the side connection visually alters at least one of the first panel or the second panel.

12. A secure card package as recited in claim 11, wherein the machine-readable activation data field is on the first portion.

13. A secure card package as recited in claim 11, wherein the machine-readable activation data field is on the second portion.

14. A secure card package as recited in claim 11, wherein at least one of the first panel and the second panel comprise the second portion.

15. A secure card package as recited in claim 14, wherein the separation line comprises a perforation in at least one of the first panel or the second panel.

16. A secure card package as recited in claim 1, wherein the proprietary account data field remains unreadable upon separation of the second portion from the first portion.

17. A secure card package as recited in claim 16, wherein a predetermined amount of deflection of the first portion with respect to the second portion along the separation line visually alters at least one of the first portion or the second portion.

18. A secure card package as recited in claim 17, wherein the predetermined amount of deflection is no more than 90 degrees.

19. A secure card package as recited in claim 1, wherein the first portion comprises an aperture through which at least a portion of the at least one activable card is exposed.

20. A secure card package as recited in claim 19, wherein the machine-readable activation data field is disposed on the at least one activable card, and wherein the machine-readable activation data field is exposed through said aperture.

21. A method for handling a secure card package having at least one activable card at a point-of-sale location, comprising:
 separating a first portion and a second portion along a separation line at the point-of-sale location to define a reference edge of the secure card package that is established only upon separation of the second portion from the first portion, wherein a machine-readable activation data field comprising a magnetic stripe is disposed with respect to the separation line, wherein upon separation of the first portion and the second portion the machine-readable activation data field is disposed relative to the reference edge to index the machine-readable activation data field relative to the reference edge such that the machine-readable activation data field is only readable by a complimentary reader upon the separating of the first portion from the second portion to define the reference edge for indexing of the machine-readable activation data field;

reading the machine-readable activation data field with a magnetic reading, wherein the reference edge indexes the machine-readable activation data field relative to the magnetic reading head, and wherein at least one activable card is activated upon reading the machine-readable activation data field with the magnetic reading head; and retaining the at least one activable card in the first portion throughout the separating step so that a proprietary account data field on the at least one activable card is unreadable.

\* \* \* \* \*